United States Patent [19]

Carstens et al.

[11] 4,108,079
[45] Aug. 22, 1978

[54] RELEASABLE STOP FOR A VEHICLE MOVING THROUGH A CONDUIT

[75] Inventors: Marion R. Carstens, Atlanta; Homer J. Bates, Roswell, both of Ga.

[73] Assignee: Georgia Tech Research Institute, Atlanta, Ga.

[21] Appl. No.: 744,616

[22] Filed: Nov. 24, 1976

[51] Int. Cl.² .................... B61B 13/10; B65G 51/30
[52] U.S. Cl. .................... 104/252; 104/156; 243/19
[58] Field of Search .................. 243/19; 105/365; 104/138 R, 155, 156, 161, 249–252, 254, 256

[56] References Cited
U.S. PATENT DOCUMENTS

| 988,520 | 4/1911 | Strauss | 104/252 |
|---|---|---|---|
| 2,017,392 | 10/1935 | Blake | 104/252 |
| 3,085,659 | 4/1963 | Ashmead | 104/250 |
| 3,438,337 | 4/1969 | Edwards | 104/138 R |
| 3,605,629 | 9/1971 | Edwards | 104/138 R |
| 3,724,690 | 4/1973 | Bates | 104/131 |
| 3,799,064 | 3/1974 | Kiruchi et al. | 104/252 |

*Primary Examiner*—Drayton E. Hoffman
*Assistant Examiner*—Carl Rowold
*Attorney, Agent, or Firm*—Newton, Hopkins & Ormsby

[57] ABSTRACT

A releasable stop for releasably stopping a vehicle moving through a conduit. A stop gate is supported for pivotal movement into and out of the path of movement of the vehicle. First and second arms are pivotally connected together between the gate and a support and a pneumatic piston and cylinder assembly actuates one arm for moving the gate between a closed and opened position. The pivoting arms are moved into or slightly past a dead center position when the gate is in the closed position whereby the impact of a vehicle engaging the gate will be transmitted to the support instead of to the piston and cylinder assembly. When the gate is closed, the dead center position of the arm maintains the stop gate in a locked position. The stop gate may be sized and shaped to entirely block the conduit to provide a dead end air cushion stop assist. In addition, the gate, the arms and the piston and cylinder assembly may be mounted on a movable support and a shock absorber may be connected to the movable support for resisting movement when heavy loads engage the gate.

3 Claims, 5 Drawing Figures

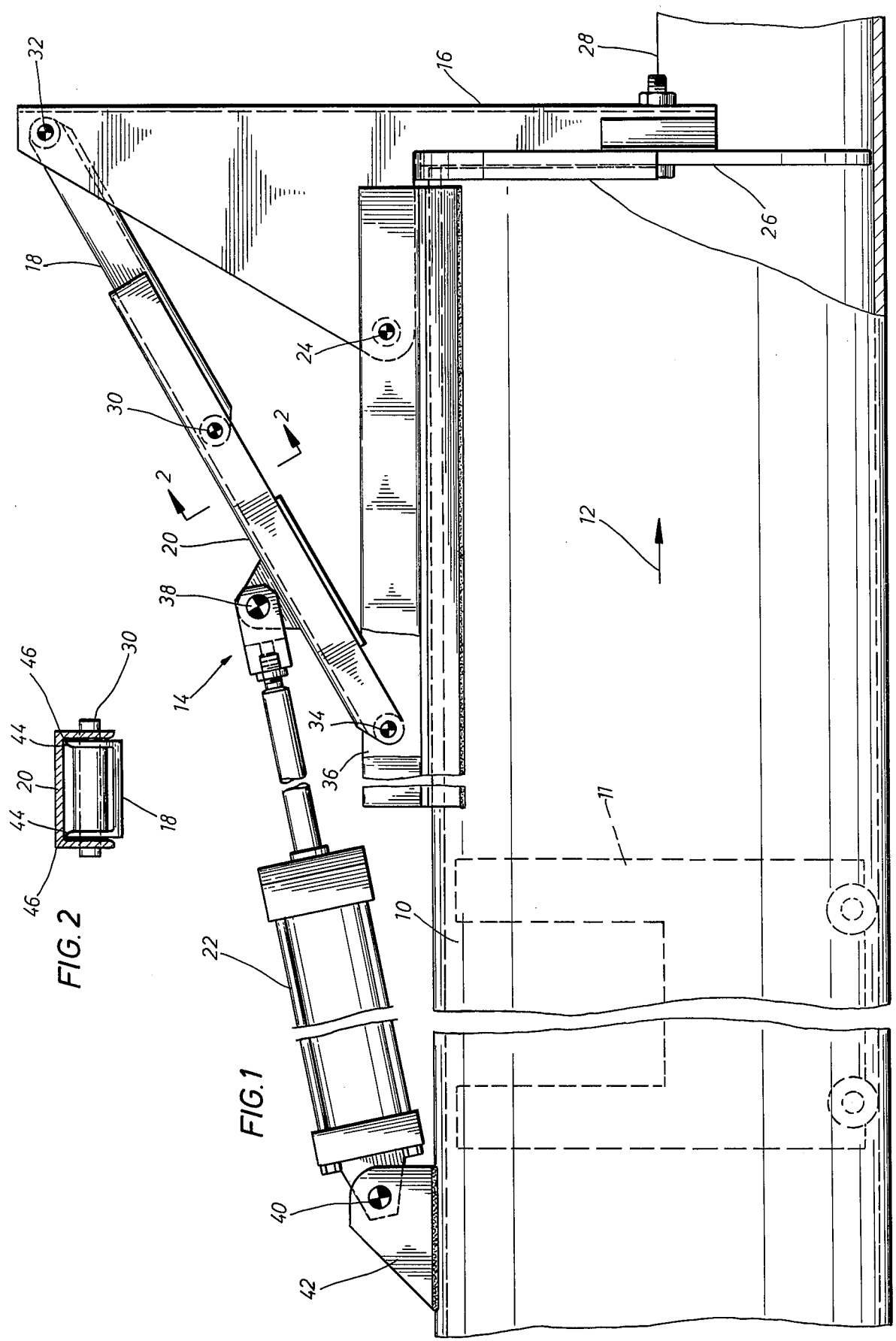

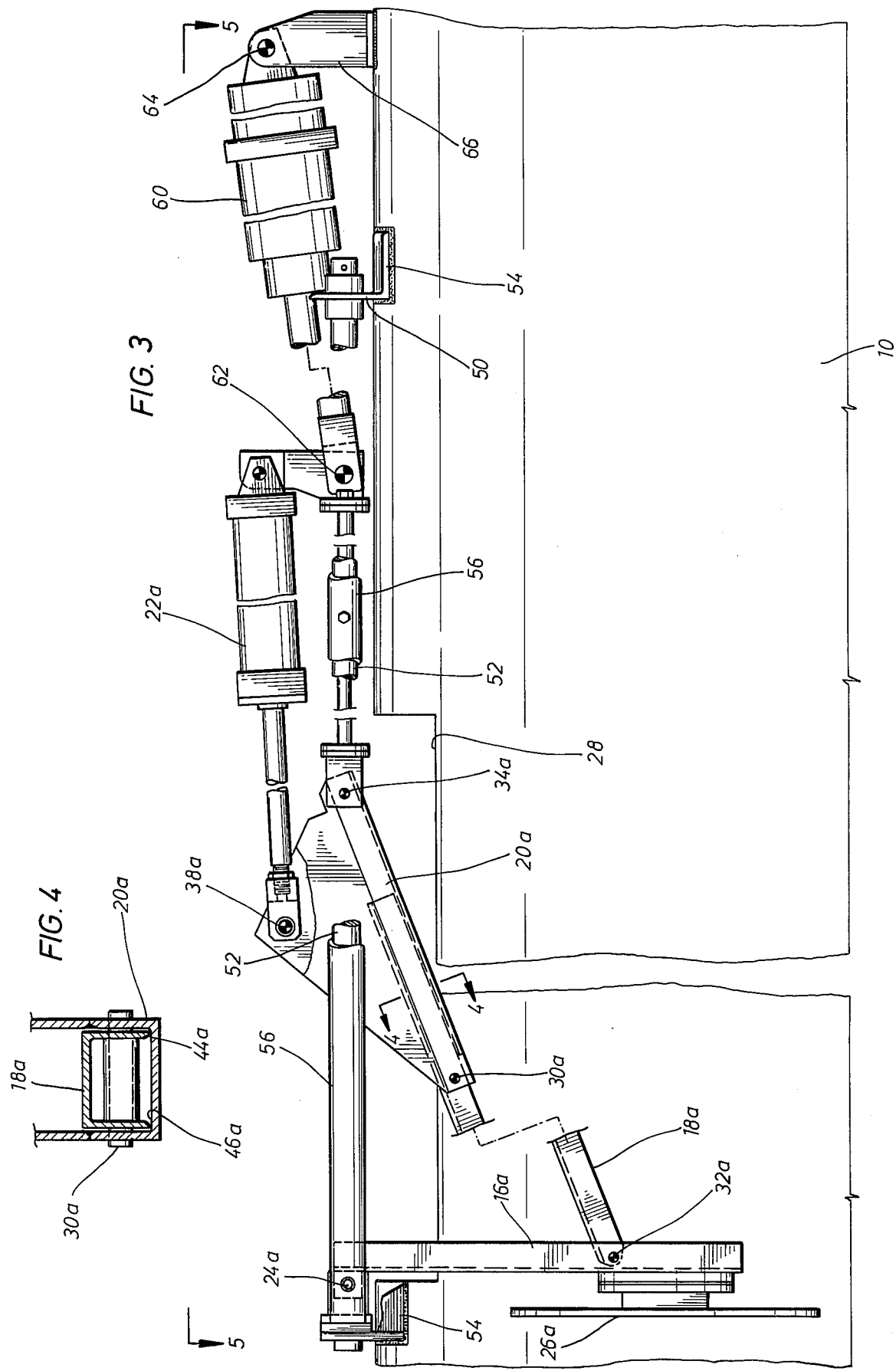

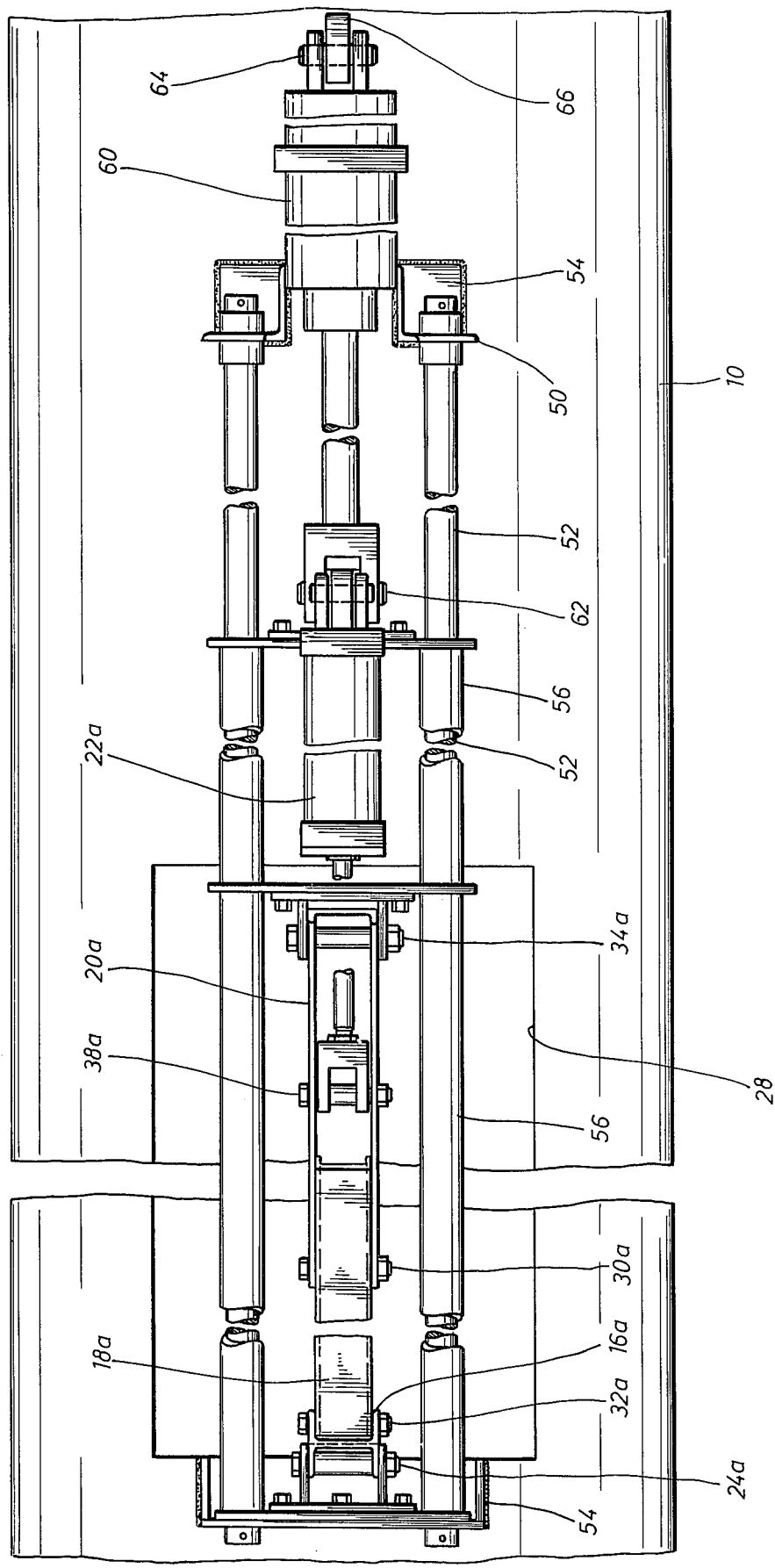

RELEASABLE STOP FOR A VEHICLE MOVING THROUGH A CONDUIT

BACKGROUND OF THE INVENTION

U.S. Pat. No. 3,724,690 discloses a releasable stop for stopping a vehicle moving through a conduit under air pressure. However, in that device the force of the stopping vehicle is applied to the air piston and cylinder assembly which undesirably is required to absorb the vehicle impact. Furthermore, the mechanism shown therein is not suitable for stopping heavier vehicles which will, on impact, compress the air in the piston and cylinder assembly and bypass the stop latch. And in the event power is disconnected from the piston and cylinder assembly, vehicles may pass through the latch.

The present invention is directed to an apparatus for releasably stopping a vehicle moving through a conduit in which a stop gate is moved between an opened and closed position by an actuating means, but in which the impacting force of the vehicle is absorbed by a linkage and the actuating mechanism is not subjected to the vehicle impact.

SUMMARY

The present invention is directed to a releasable stop stopping a vehicle moving through a transportation system.

It is one object of the present invention to provide a stop gate pivotally supported for movement into a closed position in the path of movement of a vehicle in the conduit, and into an open position out of the path of movement of a vehicle moving in the conduit. The gate is moved between the opened and closed position by actuating means such as a double acting pneumatic piston and cylinder assembly.

Another object of the present invention is to provide a linkage for absorbing the impacting force of a vehicle engaging the stop gate and for isolating the piston and cylinder assembly from such impact. Such linkage may include first and second arms pivotally connected together by a first pivot connection with the first arm pivotally connected by a second pivot connection to the gate, and the second arm being pivotally connected to a support by a third pivot connection. Arm stop means are provided for aligning the first pivot connection substantially in line with the second pivot connection and the third pivot connection or slightly past dead center when the gate is moved into the closed position whereby the impact of a vehicle engaging the stop gate will be transmitted to the support instead of to the actuating piston and cylinder assembly.

A further object of the present invention is the provision of a stop which, when positioned in the closed position, is in a locked position. This is advantageous in that a transportation system may be shut down or the power may fail but the vehicles can be held in desired position in the system.

Another object of the present invention is the provision of a stop gate which is sized and shaped to entirely block the conduit when it is moved into the closed position thereby providing a dead end air cushion to assist in stopping the vehicle.

Yet a still further object of the present invention is the provision of mounting the stop gate and the actuating mechanism on a movable support and providing a shock absorber connected to and resisting the movement of the movable support to decelerate the impact of heavily loaded vehicles.

Still other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 1 is an elevational view, partly in cross-section, illustrating one form of the releasable stop for the present invention shown in the closed position, FIG. 2 is a cross-sectional view taken along the line 2—2 of FIG. 1, FIG. 3 is an elevational view, partly in cross section, showing another embodiment of the present invention in which the releasable stop is in the closed position, FIG. 4 is a cross-sectional view taken along the line 4—4 of FIG. 3, and FIG. 5 is a cross-sectional view taken along the line 5—5 of FIG. 3.

DESCRIPTION OF THE PREFERRED EMBODIMENT

Referring now to the drawings, and particularly to FIGS. 1 and 3, a conduit or pipeline 10, generally indicated by the reference numeral 10, is shown which is part 797,405. a pipeline transportation system for moving vehicles 11 therethrough by air such as disclosed in U.S. Pat. Nos. 3,724,690 and 3,794,405.

In order to stop or position a vehicle at various locations in the conduit 10, for example, adjacent loading or unloading stations, the present invention is directed to providing a releasable stop means, generally indicated by the reference numeral 14 in FIG. 1. The stop means 14 generally includes a stop gate 16, first arm 18, a second arm 20, and an actuating means, such as a pneumatic piston and cylinder assembly 22.

The stop gate 16 is pivotally supported about pivot 24 for movement of a stop 26 into a closed position through an opening 28 in the conduit 10 and into an open position out of the conduit 10. When the stop 26 is moved to the closed position, it is moved into the path of movement of a vehicle 11 traveling in the conduit 10 and acts to engage and stop the movement of a vehicle. When the stop gate 16 is moved to the open position, the stop 26 is moved out of the path of movement of a vehicle 11 in the conduit 10 thereby allowing the vehicle to continue through the pipeline 10.

The stop gate 16 may include a stop 26, shown as a circular disc, which is sized and shaped to entirely block the interior of the conduit 10 when moved to the closed position for providing a dead end air space which also acts to slow a vehicle 11 entering the dead end space. Regardless of the speed of impact of the vehicle 26, one feature of the present invention is to insure that the impact force is not applied to the piston and cylinder assembly 22 and to further insure that the impact will not move the stop gate 16 to the open position.

The first arm 18 and the second arm 20 are pivotally connected together by a first pivot connection 30. The first arm 18 is also pivotally connected by a second pivot connection 32 to the stop gate 16. The second arm is pivotally connected by a third pivot connection 34 to a support 36 which may be fixedly secured to the pipeline 10 such as by welding. The actuating means 22, such as a double acting pneumatic piston and cylinder assembly, is pivotally connected to one of the arms, such as arm 20, by a pivot connection 38. The actuating means 22 is also connected by a pivot 40 to a support 42. When the piston and cylinder assembly 22 is in the expanded position, as shown in FIG. 1, arm 20 is rotated about pivot connection 34 and in turn rotating arm 18 about pivot connection 30 into an extended position, and in turn rotates the stop gate 16 about the pivot 24 into the closed position.

Arm stop means are provided for aligning the first pivot connection 30 substantially in line between the second pivot connection 32 and the third pivot connection 34, or slightly past a dead center position, whereby the impact of the vehicle 11 against the stop 26 will be transmitted through the arms 18 and 20 to the support 36 instead of to the air piston and cylinder assembly 22. The arms 18 and 20, as best seen in FIG. 2, may be channel-shaped in cross-section and thus provided with coacting stop shoulders 44 and 46, respectively, to stop the first pivot connection 30 in approximately or slightly past the dead center position, as shown in FIG. 1.

It is to be noted that with the pivot connection 30 located in or past the dead center position, the stop 14 is in a locked position. This is particularly advantageous in several situations. For example, even though the air pressure to the pneumatic cylinder may be released when the system is not being operated, any closed stop gate 14 will remain closed thereby holding the vehicles 11 in position and preventing them from passing through the gate 14. Thus with power failures or operational shutdowns, the position of vehicles may be maintained.

To open the stop gate 16, the piston and cylinder assembly 22 is retracted drawing the arm 20 counterclockwise about pivot 34 which in turn draws the arm 18 and pivots the gate 16 about pivot 24 to move the stop 26 to the open position and out of the path of movement of the vehicle 11.

Referring now to FIGS. 3, 4 and 5, another embodiment of the present invention is shown in which parts corresponding to those in FIGS. 1 and 2 are designated with the suffix "a". In this embodiment, the actuating mechanism for opening and closing the gate 16a by the actuating means 22a through the use of first arm 18a and second arm 20a is similar to that described in connection with FIGS. 1 and 2. However, the mechanism is mounted on a movable support and a shock absorber is connected to the movable support to assist in absorbing the impact of a vehicle hitting the stop 26a.

A fixed support generally indicated by the reference numeral 50 includes a fixed rod 52 on opposite sides of the actuating mechanism which is supported at either end by brackets 54. Movable tubes 56 are telescopically positioned on the rods 52 for slidable movement thereon. The stop means 14 is mounted on and secured to the movable tubes 56. Thus, the piston and cylinder assembly 22a, the stop gate 16a and the arms 18a and 20a are all mounted on and are movable with the movable tubes 56.

A shock absorber 60 is secured to the movable support tubes 56 and yieldably resists movement of the movable tubes 56 and stop gate 16a when the gate 16a is impacted by a vehicle. The shock absorber 60 is pivotally connected to the movable tubes 56 by a pivot 62 and is in turn secured by pivot 64 to a fixed support 66 such as welding to the pipeline 10. While any suitable shock absorber may be used, a hydraulic shock absorber Model No. AHS3X12-C sold by Ace Controls, Inc. is satisfactory.

The embodiment of FIGS. 3, 4 and 5 is actuated to the closed position, as shown, by the extension of the pneumatic piston and cylinder assembly 22a which rotates arm 20a about pivot 34a thereby extending arm 18a and rotating stop gate 16a about pivot 24a into the closed position into the inside of the conduit 10 through the opening 28. Again, the first pivot connection 30a is substantially positioned in or slightly past a dead center position between the pivot connections 32a and 34a. The impact of a vehicle against the stop 26a will be transmitted through the arms 18a and 20a to the movable tube 56 and will be resisted by the shock absorber 60. The gate 16a is moved to the open position by the retraction of the piston and cylinder assembly 22a which rotates arm 20a about pivot 34a to retract arm 18a and gate 16a.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts may be provided without departing from the spirit and the scope of the invention as hereinafter claimed.

What is claimed is:

1. A releasable stop for releasably stopping a vehicle moving by air pressure through a conduit having an opening therein comprising, a stop gate pivotally supported at a point outside of said conduit for movement through said opening into and out of a position transverse to the path of movement of a vehicle in the conduit, first and second arms pivotally connected together by a first pivot connection, the first arm being pivotally connected to the gate by a second pivot connection, and the second arm being pivotally connected to a support by a third pivot connection, said first and second arms when aligned moving the stop gate to said position transverse to the movement of said vehicle and said aligned arms being positioned generally parallel to the path of movement of said vehicle for absorbing the impact of said vehicle, an air piston and cylinder assembly connected to one of the arms for moving said arms for rotating the stop gate into and out of the path of movement of a vehicle in the conduit, coacting stop shoulders on the first and second arms for aligning the first pivot connection substantially in a dead center position with the second and third pivot connections when the stop gate is moved into the path of movement of a vehicle whereby the impact of a vehicle engaging the stop gate will be transmitted to the support instead of to the piston and cylinder assembly and said stop gate will be locked in the closed position, and said stop gate is sized and shaped to entirely block the conduit to provide a dead end air cushion when moved into the path of the vehicle.

2. A releasable stop for releasably stopping a vehicle moving by air pressure through a conduit having an opening therein comprising, a stop gate pivotally supported at a point outside of said conduit for movement through said opening into and out of a position transverse to the path of movement of a vehicle in the conduit, first and second arms pivotally connected together by a first pivot connection, the first arm being pivotally connected to the gate by a second pivot connection, and the second arm being pivotally connected to a support by a third pivot connection, said first and second arms when aligned moving the stop gate to said position transverse to the movement of said vehicle and said aligned arms being positioned generally parallel to the path of movement of said vehicle for absorbing the impact of said vehicle, an air piston and cylinder assembly connected to one of the arms for moving said arms for rotating the stop gate into and out of the path of movement of a vehicle in the conduit, and coacting stop shoulders on the first and second arms for aligning the first pivot connection substantially in a dead center position with the second and third pivot connections when the stop gate is moved into the path of movement of a vehicle whereby the impact of a vehicle engaging the stop gate will be transmitted to the support instead of to the piston and cylinder assembly and said stop gate will be locked in the closed position, said gate, said first and second arms, and said piston and cylinder assembly are mounted on a movable support, and including, means connected to and yieldably resisting movement of said movable support when a vehicle engages said stop gate.

3. The apparatus of claim 2 wherein the stop gate is sized and shaped to entirely block the conduit to provide a dead end air cushion when moved into the path of the vehicle.

* * * * *